United States Patent
Tiziani et al.

(10) Patent No.: US 10,137,746 B2
(45) Date of Patent: Nov. 27, 2018

(54) ACTUATOR

(71) Applicant: Meritor Heavy Vehicle Systems Cameri SpA, Cameri (Novara) (IT)

(72) Inventors: Eugenio Tiziani, Cameri (IT); Davide Bionaz, Cameri (IT); Marco Bassi, Cameri (IT); James Keane, Troy, MI (US)

(73) Assignee: Meritor Heavy Vehicle Systems Cameri SpA, Cameri (Novara) (IT)

( * ) Notice: Subject to any disclaimer, the term of this patent is extended or adjusted under 35 U.S.C. 154(b) by 0 days.

(21) Appl. No.: 15/085,550

(22) Filed: Mar. 30, 2016

(65) Prior Publication Data

US 2016/0288599 A1 Oct. 6, 2016

(30) Foreign Application Priority Data

Mar. 31, 2015 (EP) .................................... 15162026

(51) Int. Cl.
*B60C 29/00* (2006.01)
*B60C 23/00* (2006.01)

(52) U.S. Cl.
CPC ............ *B60C 29/00* (2013.01); *B60C 23/001* (2013.01); *B60C 23/003* (2013.01)

(58) Field of Classification Search
CPC ......... B60C 29/00; B60C 23/00; B60C 23/01; B60C 23/003
USPC ....................................... 152/415, 417, 416
See application file for complete search history.

(56) References Cited

U.S. PATENT DOCUMENTS

| 2,090,089 | A | * | 8/1937 | Wiegand ............... B60C 23/003 152/416 |
| 4,418,737 | A | | 12/1983 | Goodell et al. |
| 4,431,043 | A | | 2/1984 | Goodell et al. |
| 4,434,833 | A | * | 3/1984 | Swanson ............... B60C 23/003 141/38 |
| 4,440,451 | A | | 4/1984 | Goodell et al. |

(Continued)

FOREIGN PATENT DOCUMENTS

| CN | 103282655 A | 9/2013 |
| CN | 104044414 A | 9/2014 |

(Continued)

OTHER PUBLICATIONS

European Patent Office, Extended European Search Report for the corresponding European Patent Application No. 15162026.7 dated Sep. 15, 2015.

(Continued)

*Primary Examiner* — S. Joseph Morano
*Assistant Examiner* — Jean W Charleston
(74) *Attorney, Agent, or Firm* — Brooks Kushman P.C.

(57) ABSTRACT

An actuator for a tire inflation system, the actuator having a first component that has a first fluid passage and a second component having a second fluid passage and a sealing surface for sealing engagement with a rotatable component of a wheel assembly. The second component is movable relative to the first component between a first position, in which the first fluid passage is isolated from the second fluid passage and the sealing surface is spaced from the rotatable component, and a second position, in which the first fluid passage is in fluid communication with the second fluid passage and the sealing surface is in sealing engagement with a rotatable component.

18 Claims, 6 Drawing Sheets

(56) References Cited

U.S. PATENT DOCUMENTS

| | | | |
|---|---|---|---|
| 4,470,506 A | | 9/1984 | Goodell et al. |
| 4,582,107 A | | 4/1986 | Scully |
| 4,705,090 A | | 11/1987 | Bartos |
| 4,892,128 A | * | 1/1990 | Bartos .................. B60C 23/003 |
| | | | 137/580 |
| 5,174,839 A | | 12/1992 | Schultz et al. |
| 5,253,688 A | | 10/1993 | Tigges |
| 5,452,753 A | * | 9/1995 | Olney .................. B60C 23/004 |
| | | | 152/417 |
| 7,690,412 B1 | | 4/2010 | Jenkinson et al. |
| 7,931,061 B2 | | 4/2011 | Gonska et al. |
| 8,616,254 B2 | | 12/2013 | Kelley et al. |
| 9,452,644 B2 | | 9/2016 | Keeney et al. |
| 2002/0112802 A1 | | 8/2002 | D'Amico et al. |
| 2009/0211682 A1 | | 8/2009 | Sobotzik |
| 2013/0228258 A1 | | 9/2013 | Knapke et al. |

FOREIGN PATENT DOCUMENTS

| | | |
|---|---|---|
| CN | 204196602 U | 3/2015 |
| EP | 1147925 A2 | 10/2001 |
| JP | 2009160962 A | 7/2009 |
| WO | 2014135164 A1 | 9/2014 |

OTHER PUBLICATIONS

State Intellectual Property Office of China, Chinese Office Action for the corresponding Chinese Patent Application No. 201610187441.6 dated May 27, 2017.

* cited by examiner

ACTUATOR

TECHNICAL FIELD

The present invention relates to an actuator for a tire inflation system, for example tire inflation systems whereby air may be supplied to a rotating pneumatic tire via a rotating air passage which is coupled to a non-rotating air passage.

BACKGROUND

Known tire inflation systems, for example that of U.S. Pat. No 4,434,833, have a contact seal at the interface between the rotating and non-rotating passages in order to ensure there is no leakage of pressurized air. However, whenever the vehicle is moving, the seal is in permanent rotating rubbing contact with an adjacent component. This permanent rubbing causes contact friction which in turn results in power loss, as well as uneven wear of the seals which results in deterioration of the seal and its effectiveness.

U.S. Pat. No. 4,705,090 discloses a prior art tire inflation system which attempts to overcome this problem by providing a sealing arrangement between the rotating and non-rotating passages that includes a displaceable seal on the non-rotating component that is normally maintained out of contact with the rotating component. In this system, the displaceable seal can be moved into engagement with the rotating component by air under pressure from a first air line. This system, however, requires the provision of a second air line for the supply of air to a vehicle tire once the seal is in the engaged position. Significantly, air from the first air line is not supplied to the vehicle tire.

U.S. Pat. No. 4,892,128 describes a less complex tire inflation system with a single air line which has seals between the rotating and non-rotating components that are lightly engaged in normal use. When it is desired to change the tire pressure, air within the pressure control system is used to bring the seal members into heavy engagement, air from the same line then being supplied to the tire. Whilst this actuation system is simpler than that of U.S. Pat. No. 4,705,090, it suffers the aforementioned disadvantage of permanent contact friction between the seals, subsequent deterioration of the seals and power loss.

SUMMARY

An object of the present invention is to provide an actuator for a tire inflation assembly whereby power loss is reduced, and/or component life is increased and/or the actuation system is simplified.

Thus according to the present invention there is provided an actuator for a tire inflation system having a first component having a first fluid passage and a second component having a second fluid passage and a sealing surface for sealing engagement with a rotatable component of a wheel assembly, the second component being movable relative to the first component between a first position where the first fluid passage is isolated from the second fluid passage and the sealing surface is spaced from the rotatable component and a second position where the first fluid passage is in fluid communication with the second fluid passage and the sealing surface is in sealing engagement with the rotatable component.

This actuator arrangement is particularly advantageous as it employs a single air line, the supply of air from which can be used to both engage the seals and supply air to the tire.

The second component may move axially relative to the first component.

The first fluid passage may be isolated from the second fluid passage by virtue of engagement between the first component and the second component. The actuator may include a protrusion of one of the first component or the second component that engages the other of the first component or the second component to isolate the first component and the second component. The protrusion may be on the first component.

The first component may include an inlet for supplying a fluid to the first fluid passage. The first component may have a single inlet for supplying a fluid to the first fluid passage.

The second component may be movable to the second position in response to an increase in pressure in the first fluid passage. The second component may be movable to the second position in response to fluid supplied to the first fluid passage exerting pressure on a face of the second component. The cross-sectional area of the face on which the pressure is exerted may be substantially greater than the cross-sectional area of the second fluid passage.

A single fluid source may be used for moving the second component relative to the first component and supplying fluid to the tire inflation system.

Fluid may be supplied through the first fluid passage, moving the second component to the second position, the fluid passing via the second fluid passage to a tire to be inflated.

The second component may include a first bearing having an axis that is offset relative to an axis of the rotatable component, for example the axis of rotation of the rotatable component, e.g., to reduce friction between the first component and the second component when the second component moves relative to the first component. Additionally or alternatively, the second component may include a second bearing having an axis that is co-incident with an axis of the rotatable component, for example the axis of rotation of the rotatable component, e.g., to reduce friction between the first component and the second component when the second component moves relative to the first component.

The second component may include a body, the sealing surface being resiliently mounted relative to the body. The resilient mounting may be provided by an elastomeric, for example rubber-like, member.

The actuator may include a bias device that biases the sealing surface of the second component away from the rotatable component. The actuator may have a plurality of bias devices arranged around an annulus to bias the sealing surface of the second component away from the rotatable component. The bias devices may be spaced equally around the annulus, for example at 120° relative to the other bias devices. The actuator may include a pin to prevent rotation of the first component relative to the second component. The actuator may include a plurality of pins to prevent rotation of the first component relative to the second component. The pins may be spaced equally around the annulus, for example at 120° relative to the other pins. The one or more pins may each be associated with a bias device.

According to another aspect of the invention there is provided a system for changing a pressure in a tire including an actuator according to claim 1 and a rotatable component having a rotatable fluid passage, a rotatable sealing surface arrangement and being rotatably fast to a wheel, the sealing surface being selectively engagable with the rotatable sealing surface arrangement to selectively fluidly connect the first fluid passage to the rotatable fluid passage.

According to a further aspect of the invention there is provided a method of changing a pressure in a tire including providing a vehicle with a tire; providing a rotatable component having a rotatable fluid passage connected to the tire, a rotatable sealing surface arrangement and being rotatably fast to the tire; providing an actuator according to claim 1 that is selectively engagable with the rotatable sealing surface arrangement to selectively fluidly connect the first fluid passage and the rotatable fluid passage; operably connecting the rotatable fluid passage to the tire; and changing a pressure in the actuator to change pressure in the tire by passing fluid through the first fluid passage, then through the second fluid passage, then through the rotatable fluid passage.

The pressure in the tire may advantageously be changed while the vehicle is moving.

BRIEF DESCRIPTION OF THE DRAWINGS

The invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to the figures there is shown a tire inflation system 5 having a pressurized air supply 10 (shown schematically), an actuator 20, a wheel hub 30, a wheel spindle 40 and a tire 15 (shown schematically).

The pressurized air supply 10 has a fluid passage 12. The fluid passage 12 has a valve 8.

The tire 15 has a valve 18, for example a Schrader valve.

The wheel hub 30 has an axis A, about which it can rotate, a flange 32 that has an outer cylindrical surface 31, a generally flat annular surface 34, and a fluid passage 36 that has an inlet 38 on the generally flat surface 34.

The wheel spindle 40 has an axis A, about which it is held stationary, a first portion 42 having an outer cylindrical surface 44 and a diameter B, a second portion 46 having an outer cylindrical surface 48 and a diameter C, and a shoulder 50 between the first portion 42 and the second portion 46.

The actuator 20 has a first component 22 and a second component 24.

Figure 4:
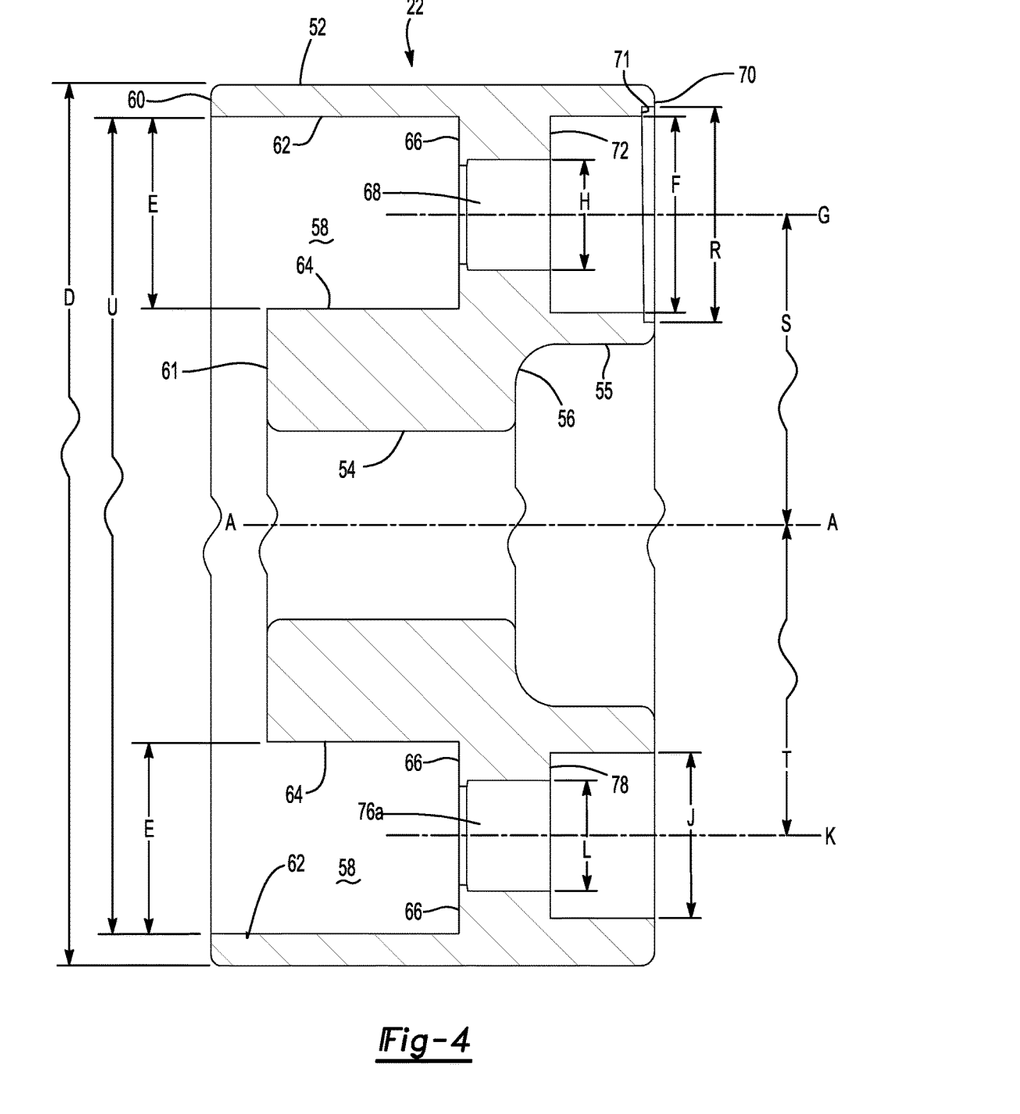
FIG. 4 is a schematic sectional view of a first component of the actuator of FIG. 2.

As shown in FIG. 4, the first component 22 is generally annular and has an axis A, about which it is held stationary, an outer cylindrical surface 52 having a diameter D, a first inner cylindrical surface 54, a second inner cylindrical surface 55, a first flat annular surface 60 at a first axial position and a second flat annular surface 61 at a second axial position. There is a shoulder 56 between the first and second inner cylindrical surfaces 54, 55.

The first component 22 has a generally annular recess 58. The recess 58 has a cylindrical outer wall 62, a cylindrical inner wall 64 and a flat annular surface 66. The recess 58 has a width E.

The first component 22 has a through hole 68 having an axis G that extends from a generally flat annular surface 70 to the flat annular surface 66. The hole 68 is a stepped hole having a first diameter R, a second diameter F and a third diameter H. The hole 68 has a step 71 between the first diameter R and the second diameter F and a second step 72 between the second diameter F and the third diameter H. Axis G is spaced from axis A by a distance S.

The first component 22 has a second through hole 76a having an axis K (see FIG. 4) that extends from the flat annular surface 70 to the generally flat annular surface 66. The hole 76a is a stepped hole having a first diameter J and a second diameter L. The hole 76a has a step 78 between the first diameter J and the second diameter L. Axis K is spaced from axis A by a distance T.

Figure 2:
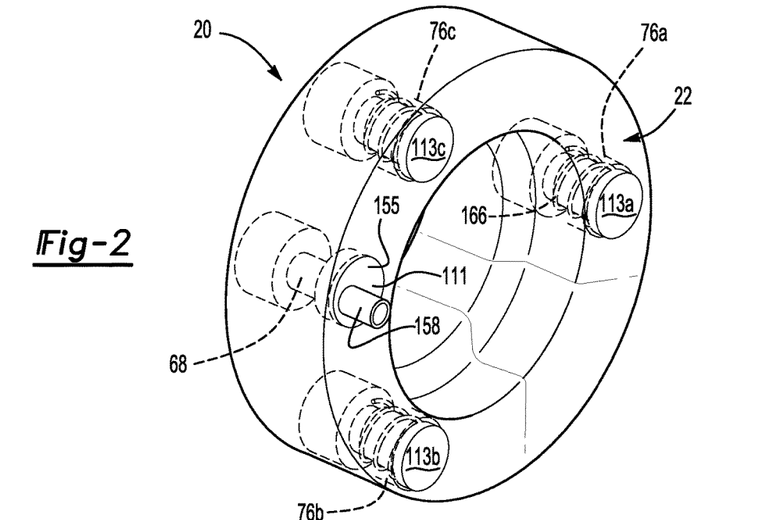
FIG. 2 is a side view of an actuator of the tire inflation system of FIG. 1.
Figure 3:
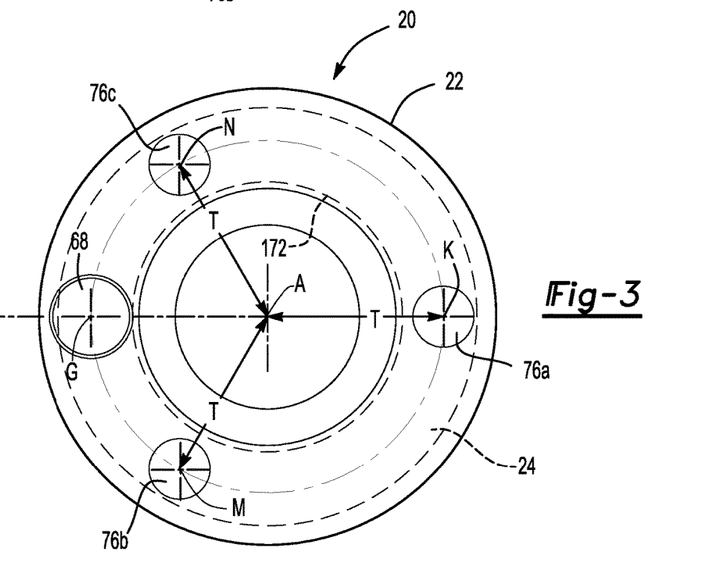
FIG. 3 is a side view of the actuator of FIG. 2.

As shown in FIGS. 2 and 3, the first component 22 has two further holes 76b, 76c. The third and fourth holes 76b, 76c are the same shape as the second hole 76a and have axes M and N, respectively. Axes K, M and N are parallel to each other. Axes M and N are each spaced from axis A by a distance T. The three holes 76a, 76b and 76c are equispaced around the annular first component 22 at 120° relative to each other.

The first hole 68 is equispaced between two of the holes 76b, 76c and diagonally opposite one of the holes 76a. The axis G of the first hole 68 is parallel to the axes K, M, N of the other holes 76a, 76b, 76c.

Figure 5:
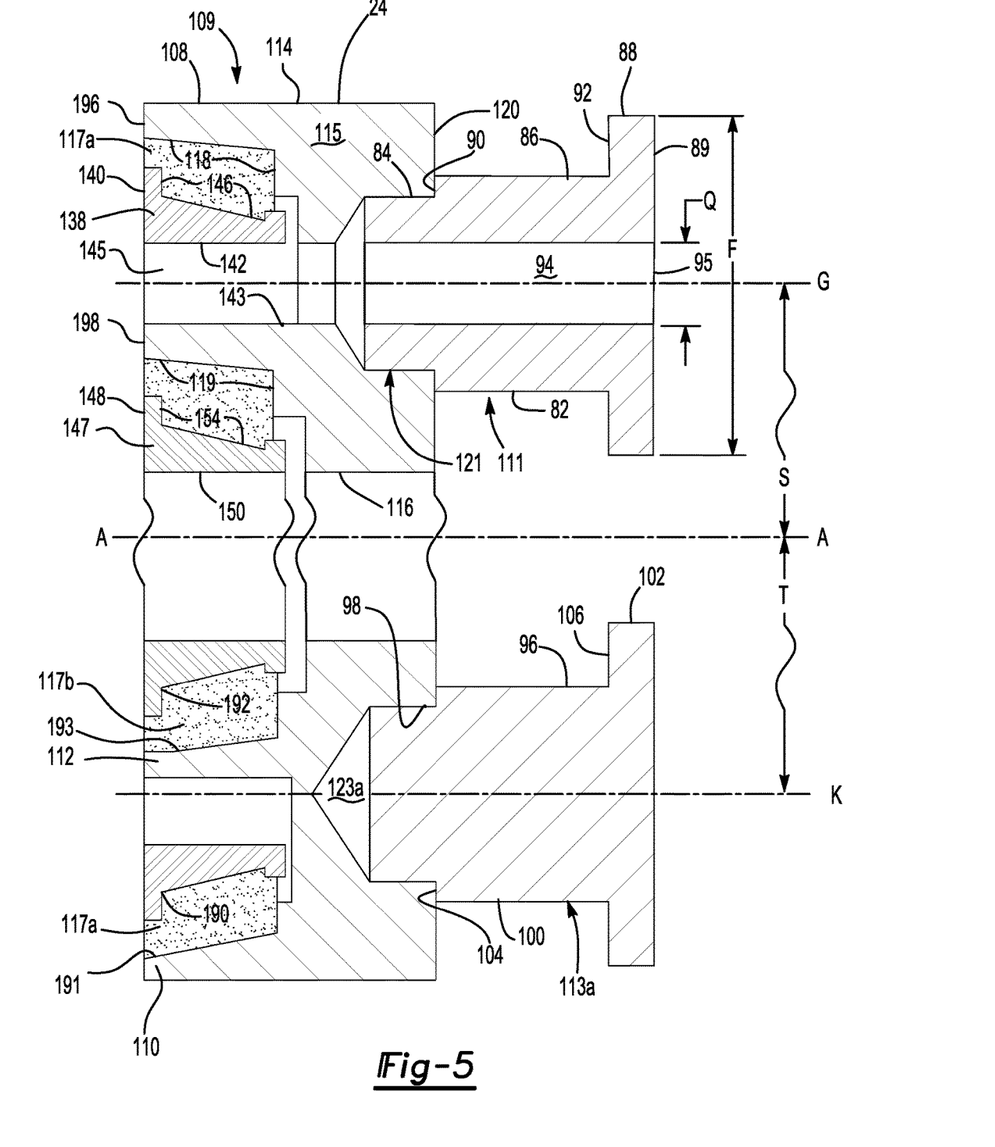
FIG. 5 is a schematic sectional view of a second component of the actuator of FIG. 2.

Referring now to FIGS. 2 and 5, the second component 24 has an annular sub-assembly 109 and four pins 111, 113a, 113b, 113c.

Annular sub-assembly 109 has a generally annular body 108, outer and inner ring structures 138, 147 and resilient members 117a, 117b that are assembled to annular body 108, as will be further described below. The annular sub-assembly 109 has an outer cylindrical surface 114 having an axis A.

The generally annular body 108 has a main body portion 115, a first annular protrusion 110 and a second annular protrusion 112. The main body portion 115 has an inner cylindrical surface 116 and a generally annular surface 120.

Protruding from the main body portion 115 is the first annular protrusion 110 which has a generally flat annular 'L'-shaped surface 118 and generally flat annular surface 196. Also protruding from the main body portion 115 is the second annular protrusion 112, which has a generally annular 'L'-shaped surface 119, generally flat annular surface 198 and generally cylindrical surface 143.

The annular sub-assembly 109 has four holes in the generally flat annular surface 120. As shown in FIG. 5, one of the holes 121 is a through hole with an axis G and a second hole 123a is a blind hole with an axis K. The two further holes (not shown) are blind holes, have axes M and N and are the same shape as hole 123a.

The outer ring structure 138 has a generally 'L'-shaped cross-section, a flat annular surface 140, an inner cylindrical surface 142 and a surface 146.

The inner ring structure 147 has a generally 'L'-shaped cross-section, a flat annular surface 148, an inner cylindrical surface 150, and a surface 154.

The outer resilient member 117a has an inner surface 190 and an outer surface 191.

The inner resilient member 117b has an inner surface 192 and an outer surface 193.

The first pin 111 of the second component 24 has an axis G and is shown in FIGS. 2, 5, 6 and 7. The first pin 111 has a stepped cylindrical body 82 having a first outer surface 84, a second outer surface 86, a third outer surface 88, a first shoulder 90 between the first surface 84 and the second surface 86 and a second shoulder 92 between the second surface 86 and the third surface 88. The first pin 111 has a flat annular face 89 adjacent to the third outer surface 88. The flat annular face 89 has a cross sectional area of $(\pi \times (F/2)^2) - (\pi \times (Q/2)^2)$. The first pin 111 has a fluid passage 94 and opening 95, both the passage 94 and opening 95 having a diameter Q. The opening 95 has a cross-sectional area of $\pi \times (Q/2)^2$.

Figure 8:
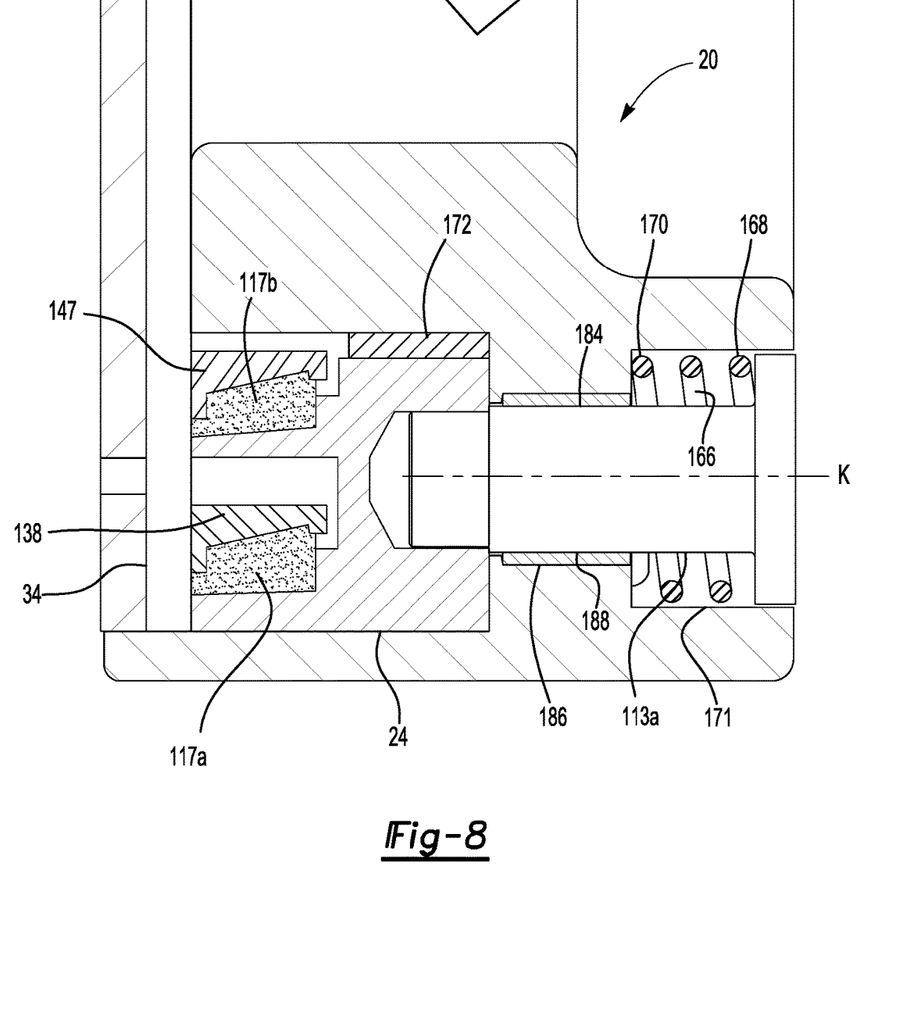
FIG. 8 is an alternative sectional part view of the actuator of FIG. 1.

The second pin 113a of the second component 24 has an axis K and is shown in FIGS. 2, 5 and 8. The second pin 113a has a second stepped cylindrical body 96 having a first outer surface 98, a second outer surface 100, a third outer surface 102, a first shoulder 104 between the first surface 98 and the second surface 100 and a second shoulder 106 between the second surface 100 and the third surface 102. As shown in FIG. 2, the second component 24 has two further pins, namely third pin 113b and fourth pin 113c. The third and fourth pins 113b, 113c are the same shape as the second pin 113a and have axes M and N, respectively.

The actuator 20 has a cap 155 (see FIGS. 2, 6 and 7) having a generally annular body 157 with an axis G. The cap 155 has a flange portion 156 having an inlet 158 with a through hole 159. The inlet 158 and through hole 159 have an axis O. The cap 155 has a protrusion 160 having a diameter P. The cap structure 155 has an outer cylindrical wall 162 and an annular manifold 164.

The actuator 20 has a main bush 172 having an axis A, an outer surface 174 and an inner surface 176, as shown in FIGS. 1, 6, 7 and 8.

Figure 1:
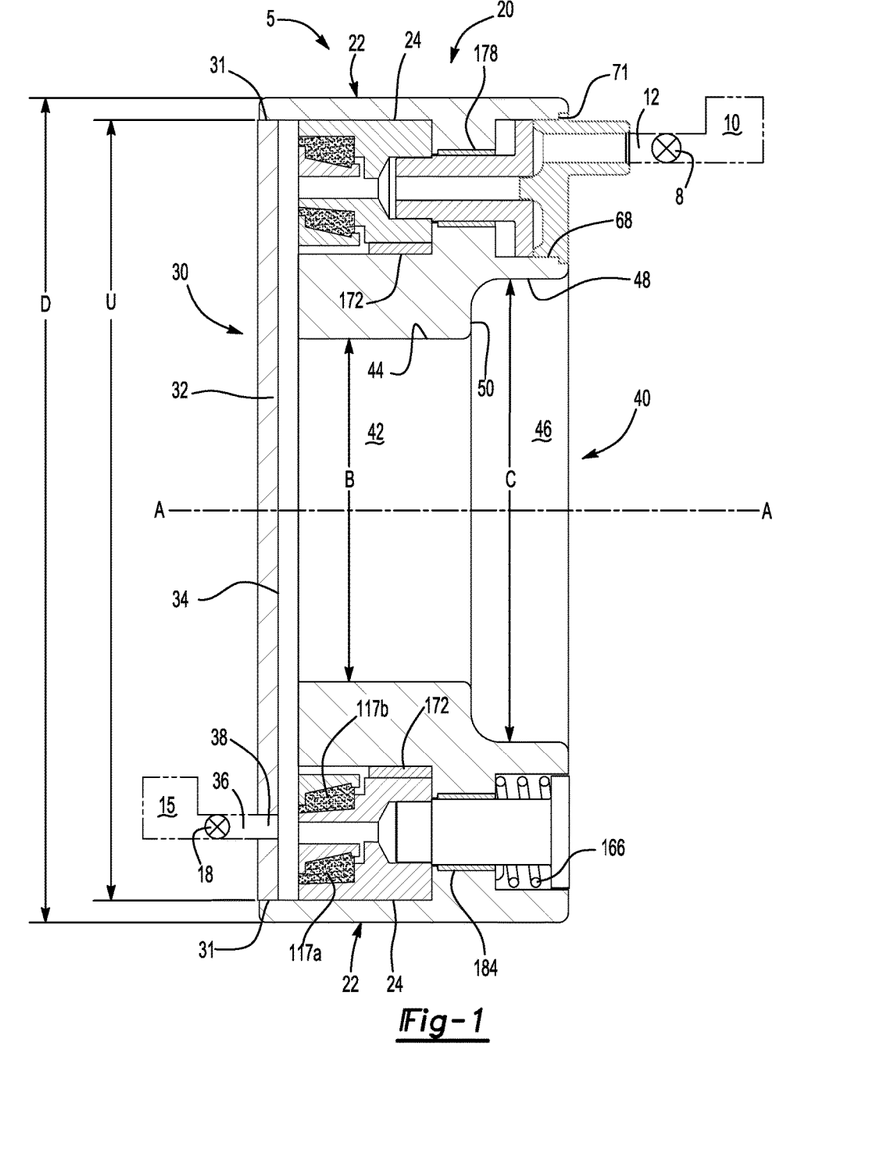
FIG. 1 is a cross section view of a tire inflation system according to the present invention.
Figure 6:
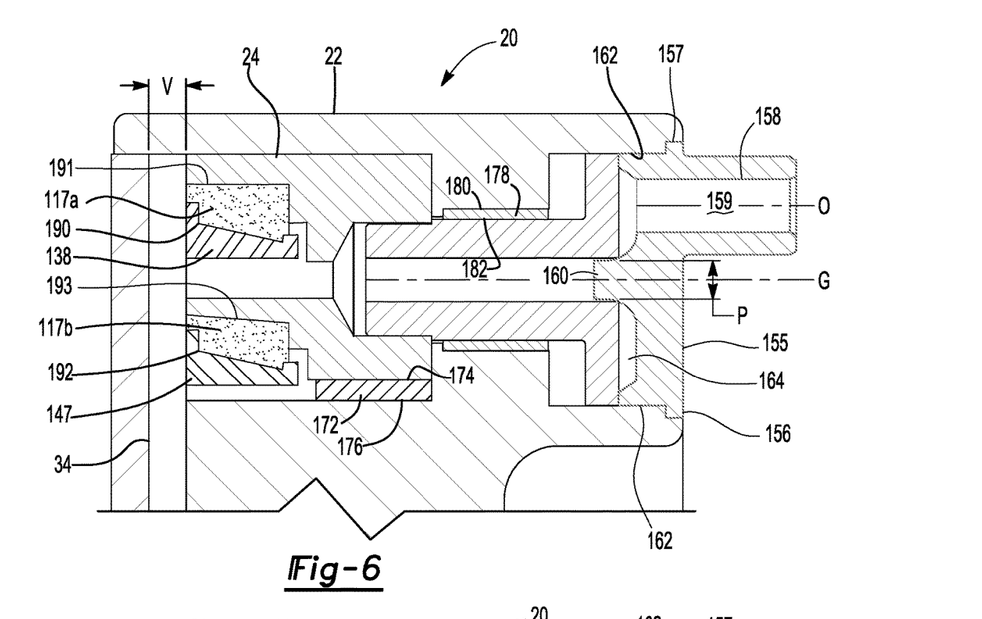
FIG. 6 is a sectional part view of the actuator of FIG. 1 in a first position.
Figure 7:
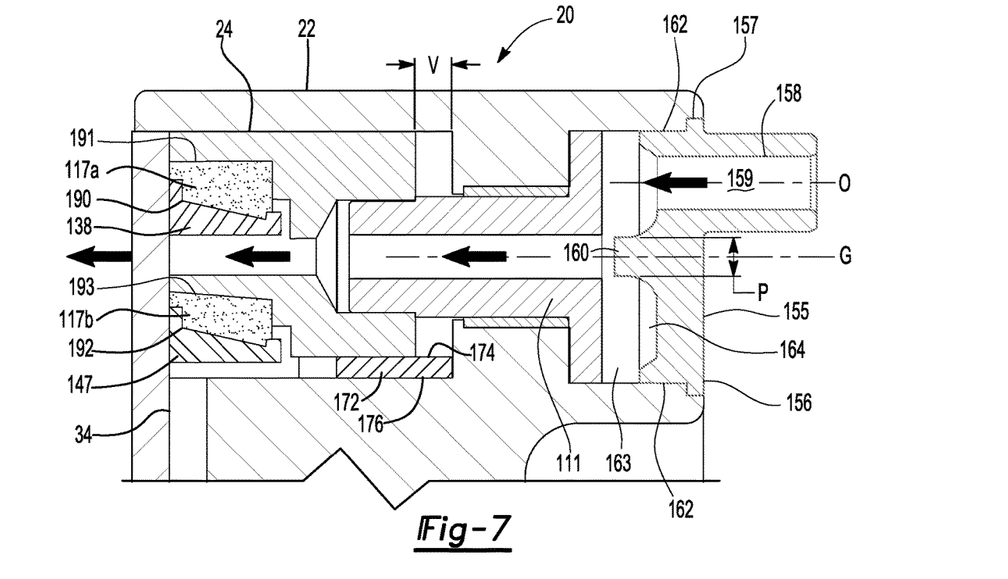
FIG. 7 is a sectional part view of the actuator of FIG. 1 in a second position.

The actuator 20 has a second bush 178 having an axis G, an outer surface 180 and an inner surface 182, as shown in FIGS. 1, 6 and 7.

The actuator 20 has a third bush 184 having an axis K, an outer surface 186 and an inner surface 188, as shown in FIGS. 1 and 8. The actuator 20 has two further bushes (not shown) that are the same shape as the third bush 184 and have axes M and N.

The actuator 20 has a first helical spring 166 (see FIG. 8) having a first end 168, a second end 170 and an axis K. The actuator 20 has two further helical springs (not shown) that are the same shape as the first helical spring 166 and have axes M and N.

The actuator 20 is assembled as follows:

The annular sub-assembly 109 is constructed by taking a generally annular body 108 and assembling outer ring structure 138 to the first annular protrusion 110 of the main body portion 115 using resilient member 117a and assembling inner ring structure 147 on the second annular protrusion 112 of the main body portion 115 using resilient member 117b.

Resilient member 117a is mounted between the outer ring structure 138 and first annular protrusion 110 such that the inner surface 190 of resilient member 117a is in abutment with surface 146 of the outer ring structure 138 and the outer surface 191 of resilient member 117a is in abutment with surface 118 of the first annular protrusion 110 (as shown in FIG. 6). The outer ring structure 138 and resilient member 117a define an outer face seal.

Resilient member 117b is similarly mounted between the inner ring structure 147 and second annular protrusion 112 such that the inner surface 192 of resilient member 117b is adhered to the surface 154 of the inner ring structure 147 and the outer surface 193 of resilient member 117b is in abutment with surface 119 of the second annular protrusion 112 (as shown in FIG. 6). The inner ring structure 147 and resilient member 117b define an inner face seal.

In this way the generally annular surfaces 118, 119 provide seats for the outer and inner face seals.

An annular manifold 145 is formed between surface 142 of the outer ring structure 138 and inner surface 143 of the second annular protrusion 112.

The first component 22 and bushings 172, 178 and 184 are assembled together as described below.

Main bushing 172 is inserted into the recess 58 such that the inner surface 176 of the main bushing 172 is in interference fit engagement with the cylindrical inner wall 64 of the recess 58 thereby making the bush 172 axially and rotationally fast with respect to the first component 22.

The second bushing 178 is inserted into the hole 68 such that the outer surface 180 of the second bushing 178 is in interference fit engagement with the walls of the hole 68 having a diameter H thereby making the bush 178 axially and radially fast with respect to the first component 22.

The third bushing 184 is inserted into the hole 76a such that the outer surface 186 of the third bushing 184 is in interference fit engagement with the walls of the hole 76a having a diameter L. Two additional bushings (not shown) are inserted into holes 76b, 76c in a similar way thereby making the third bush 184 and two additional bushes (not shown) axially and radially fast with respect to the first component 22.

The annular sub-assembly 109 is inserted into the recess 58. Surface 116 of the main body portion 115 of the generally annular body 108 is in sliding engagement with the outer surface 174 of the main bushing 172. Cylindrical surface 150 of the inner ring structure 147 is adjacent but spaced from the cylindrical inner wall 64 of the recess 58 and cylindrical outer wall 62 of the recess 58 is adjacent but spaced from surface 114 of the annular sub-assembly 109. Generally flat annular surface 120 of the generally annular body 108 abuts the generally flat annular surface 66 of the recess 58.

To assemble the first component to the second component a helical spring 166 is inserted into the hole 76a such that a second end 170 of the spring 166 abuts step 78 within the hole 76a and an outer surface 171 of the spring 166 is a loose fit with the walls of the hole 76a having a diameter J.

The second pin 113a is inserted through the hole 76a in the first component 22 and is fitted into the blind hole 123a in the generally flat annular surface 120 of the generally annular body 108. A first shoulder 104 of the pin 113a abuts the generally flat annular surface 120. The second outer cylindrical surface 100 of the pin 113a is in sliding engagement with the inner surface 188 of the third bushing 184. The third outer cylindrical surface 102 of the pin 113a is in clearance fit with the walls of the hole 76a having a diameter J. The shoulder 106 of the pin 113a abuts a first end 168 of the helical spring 166, which is under compression since the free length of the spring 166 prior to assembly was such that for end 170 to be press fitted with step 78 compression of the spring 166 is required.

Two additional helical springs (not shown) are inserted into holes 76b, 76c as described for the first helical spring 166 above. The third and fourth pins 113b, 113c are inserted into holes 76b, 76c, respectively, as described for the second pin 113a above.

The first pin 111 is inserted through the hole 68 in the first component 22 and into the through-hole 121 in the generally flat annular surface 120 of the generally annular body 108. The first shoulder 90 of the pin 111 abuts the generally flat annular surface 120. The second outer cylindrical surface 86 of the pin 111 is in sliding engagement with the inner surface 182 of the second bushing 178. The third outer cylindrical surface 88 of the pin 111 is in sliding engagement with the walls of the hole 68 having a diameter F. The surface 88 and the walls of the hole 68 having a diameter F are in sealing contact, with a small gap between surface 88 and the walls of the hole 68 having a diameter F.

The cap 155 is fitted to the actuator assembly 20. The outer wall 162 of the body 157 of the cap 155 is in interference engagement fit with the walls of the hole 68 having a diameter F. The flange 156 of the cap 155 acts as an assembly aid and fits into the walls of the hole 68 having a diameter R but cannot pass beyond the shoulder 71 of the hole 68 and so cannot be pushed too far into the hole 68. The helical spring 166 bias the pin 111 such that the manifold 164 of the cap 155 is adjacent to the annular face 89 of the pin 111 and the protrusion 160 of the cap 155 is in a loose fit with the walls of the fluid passage 94.

The actuator assembly 20 is fitted to the wheel spindle 40. Inner surface 54 of the first component 22 is in interference fit engagement with the outer surface 44 of the first portion 42 of the wheel spindle 40 and shoulder 56 and inner surface 55 of the first component 22 surround shoulder 50 and outer surface 48 of the wheel spindle 40. Accordingly, the actuator assembly 20 is held rotatably and axially fast relative to the wheel spindle 40.

A wheel hub 30 is mounted on bearings (not shown) which in turn are mounted on the wheel spindle 40 assembly such that generally flat annular surface 34 of the wheel hub is adjacent to but spaced from the annular surface 140 of the outer ring structure 138, annular surface 148 of the inner ring structure 147 and generally flat annular surface 61 of the first component 22.

The wheel hub 30 has a diameter U and the outer walls 31 are adjacent to the cylindrical outer wall 62 of the recess 58 in the first component. The inlet 38 of the fluid passage of the wheel hub 30 is radially aligned with the manifold 145 of the actuator 20.

The wheel hub 30 has a fluid passage 36 which connects inlet 38 with a tire 15 on a wheel (not shown).

Fluid passage 12 connects pressurized air supply 10 to the inlet 158 of the through hole 159.

Operation of the actuator 20 is as follows:

As described above, the actuator 20 is held rotatably fast relative to the wheel spindle 40. Wheel hub 30 is able to rotate relative to the wheel spindle 40. The springs 166 bias the first component 22 of the actuator 20 away from the wheel hub 30 such that the actuator 20 is in a first position (see FIGS. 1 and 6) in which surface 140 of outer ring structure 138 and surface 148 of inner ring structure 147 are spaced from the rotatable surface 34 of the wheel hub 30 by a distance V, surface 120 of the annular body 108 abuts surface 66 of the recess 58 and the protrusion 160 of the cap 155 is positioned within the walls of the fluid passage 94.

When it is desired to add air to the tire 15, valve 8 is opened thereby allowing air to pass out of pressurized air supply 10 into fluid passage 12. Air then flows through the through-hole 159 in the inlet 158 of cap 155.

The outer surface 88 of the pin 111 is in sufficient sealing contact with the walls of hole 68 having a diameter F that a volume of air is collected within a cavity 163 between the face 89 of the pin 111 and the manifold 164 of the cap 155.

As the volume of air within the cavity 163 increases, so the pressure of air within the cavity 163 increases. The air pressure acts on the face 89 of the pin 111 and the manifold 164 of the cap 155.

When the pressure of air in the cavity 163 is such that the force acting on face 89 of the pin 111 is greater than the force of the springs 166 acting on the pins 113a, 113b, 113c, the pin 111 is moved to the left when viewing FIGS. 1 and 6 such that surface 140 of outer ring structure 138 and surface 148 of inner ring structure 147 move towards the rotatable surface 34 of the wheel hub 30 and surface 120 of the annular body 108 moves away from surface 66 of the recess 58 until the actuator 20 has adopted the second position (as shown in FIG. 7).

In the second position, surface 140 of outer ring structure 138 and surface 148 of inner ring structure 147 are in sealing contact with the rotatable surface 34 of the wheel hub 30, surface 120 of the annular body 108 is spaced from surface 66 of the recess 58 by a distance V and the protrusion 160 of the cap 155 is no longer positioned within the walls of fluid passage 94.

When the actuator 20 has adopted the second position (as shown in FIG. 7) air can pass from the cavity 163 through the fluid passage 94 into the manifold 145, and from the manifold 145 to the rotatable fluid passage 36. The increased pressure of air in the rotatable fluid passage 36 causes the Schrader valve 18 to open and allows air to pass into the tire 15.

When the pressure of air in the tire 15 is sufficient, the valve 8 is closed to prevent further air entering the actuator 20 from the pressurized air supply 10. Air in the actuator 20 naturally decays from the system by passing through small gaps between the annular body 108 and the walls 62 and 64 of the recess 58 in the first component 22 and between the surface 88 of the pin 111 and the walls of the hole 68 having a diameter F. The decreased pressure of air in the rotatable fluid passage 36 causes the Schrader valve 18 to close, preventing the loss of air from the tire 15.

As the pressure of air in the cavity 163 is reduced, the force acting on the face 89 of the pin 111 is less than that of the springs 166 acting on the pins 113a, 113b, 113c and so the pin 111 is moved to the right when viewing FIGS. 1 and 6 to the first position in which surface 140 of outer ring structure 138 and surface 148 of the inner ring structure 147 move away from the rotatable surface 34 of the wheel hub 30 and surface 120 of the annular body 108 moves towards surface 66 of the recess 58 until the actuator has adopted the first position (as shown in FIGS. 1 and 6 and as described above).

In this way, a single source of air, the pressurized air supply 10, can be used to both activate the actuator 20 and supply air to a tire 15 of a vehicle and the rotatable surface 34 of the wheel hub 30 is only brought into sealing contact with the sealing surfaces 140, 148 of the actuator 20 when required, thereby preventing unnecessary wear of the sealing surfaces 140, 148 and consequential power loss.

Resilient members 117a, 117b provide better sealing engagement between the rotatable surface 34 of the wheel hub 30 and sealing surfaces 140, 148 of the outer and inner ring structures 138, 147.

Resilient members 117a, 117b provide the actuator 20 with axial resilience. The resilient members 117a, 117b allow the sealing surfaces 140, 148 to contact the rotatable surface 34 of the wheel hub 30 just prior to the fluid passage 94 being brought into fluid communication with the cavity 163 by the pin 111 moving away from the protrusion 160 of the cap 155. The resilience of the resilient members 117a, 117b allows the pin 111 to move further away from the protrusion 160 to open the fluid passage 94.

In the embodiment described above a protrusion of the first component engages the second component to isolate the first fluid passage from the second fluid passage. In particular, the protrusion 160 of the cap 155 of the first component 22 is positioned within the walls of the fluid passage 94 thereby isolating the first fluid passage 159 from the second fluid passage 94. In other embodiments of the invention, a protrusion of the second component engages the first component to isolate the first fluid passage from the second fluid passage. For example, the pin 111 may include a protrusion on its face 89 that engages an aperture in the cap 155 of the first component 22 to isolate the first fluid passage 159 from the second fluid passage 94.

As described above the cross sectional area of the face 89 of the pin 111 of the second component 24 is greater than the cross sectional area of the second fluid passage 94 because the face 89 has a cross sectional area of $(\pi \times (F/2)^2) - (\pi \times (Q/2)^2)$, where $(\pi \times (Q/2)^2)$ is the cross sectional area of the second fluid passage 94. In an alternative embodiment the cross sectional area of the face 89 may be increased relative to the cross sectional area of the second fluid passage 94 in order to lower the pressure of air required to move the second component 24 relative to the first component 22. Alternatively, in another embodiment the cross sectional area of the face 89 may be decreased relative to the cross sectional area of the second fluid passage 94, resulting in an increase in the pressure of air required to move the second component 24 relative to the first component 22.

In the embodiment described above, the actuator 20 has one bearing 172 having an axis A coincident with the axis of rotation of the rotatable wheel hub 30 and four further bearings having axes G, K, M and N that are offset relative to the axis of rotation A of the rotatable wheel hub 30. The purpose of the bearings is to enable axial movement of the second component 24 relative to the first component 22. It will be understood by a person skilled in the art that in some embodiments, the actuator may not have any bearings, alternatively in other embodiments the actuator may include any number of bearings having axes coincident with the axis of rotation of the rotatable wheel hub 30 and/or any number of bearings having axes that are offset relative to the axis of rotation of the rotatable wheel hub 30 without departing from the scope of the present invention. Furthermore, any type of bearing or bushing that enables movement of the second component 24 relative to the first component 22 may be used.

The resilient members 117a, 117b may be made from any suitable resilient material, for example any elastomeric material. The resilient members 117a, 117b may be O-rings. In the embodiment described above, the sealing surfaces 140, 148 are independently mounted to the annular body 108 of the second component 24. In alternative embodiments of the present invention, the sealing surfaces 140, 148 may be connected. The sealing surfaces 140, 148 may, for example, be part of a single ring structure.

In the first embodiment of the invention the sealing surfaces 140, 148 are generally flat. In alternative embodiments the sealing surfaces 140, 148 may be conical.

In the first embodiment, resilient member 117a is mounted between the outer ring structure and the first annular protrusion 110. In alternative embodiments, inner surface 190 of resilient member 117a may be adhered to surface 146 of the outer ring structure 138 and/or the outer surface 191 of resilient member 117a may be adhered to surface 118 of the first annular protrusion 110.

Similarly in the first embodiment, the resilient member 117b is mounted between the inner ring structure 147 and the second annular protrusion 112. In alternative embodiments, the inner surface 192 of resilient member 117b may be adhered to the surface 154 of the inner ring structure 147 and/or the outer surface 193 of the resilient member 117b may be adhered to surface 119 of the second annular protrusion 112.

In alternative embodiments, outer and inner ring structures 138, 147 may be separately bonded to annular body 108. In such embodiments, the annular sub-assembly 109 may be constructed by taking generally annular body 108 and adhering outer ring structure 138 to the first annular protrusion 110 of the main body portion 115 using a rubber adhesive and adhering inner ring structure 147 to the second annular protrusion 112 of the main body portion 115 using a rubber adhesive. The rubber adhesive may be allowed to cure such that resilient members in the shape of resilient members 117a and 117b are formed.

In this embodiment, a resilient member that is in the shape of resilient member 117a is formed between the outer ring structure 138 and first annular protrusion 110, such that an inner surface of the resilient member is adhered to surface 146 of the outer ring structure 138 and an outer surface of the resilient member is adhered to surface 118 of the first annular protrusion 110.

Similarly, a resilient member that is in the shape of resilient member 117b is formed between the inner ring structure 147 and second annular protrusion 112 such that an inner surface of the resilient member is adhered to the surface 154 of the inner ring structure 147 and an outer surface of the resilient member is adhered to surface 119 of the second annular protrusion 112.

In the embodiment described above, the second component 24 has a single pin 111 having a fluid passage 94 and an opening 95. It will be appreciated that the second component may have a plurality of pins, each having fluid passage and an opening.

As described above, the second component 24 has three pins 113a, 113b, 113c. The pins 113a, 113b, 113c prevent rotation of the first component 22 relative to the second component 24. It will be appreciated that rotation of the first component 22 relative to the second component 24 may be prevented by any suitable means or alternatively any number of pins may be used.

In the embodiment described above, each of the three pins 113a, 113b, 113c is associated with a spring 166. The purpose of the springs 166 is to bias the first component 22 away from the wheel hub 30. It will be appreciated that the first component 22 may be biased away from the wheel hub 30 by any suitable means. Alternatively, any number of springs that may, or may not, be associated with pins may be used to bias the first component 22 away from the wheel hub 30.

The present invention allows the tire of a vehicle to be inflated while the vehicle is moving and when the vehicle is stationary.

The valve 8 may be opened in order to actuate the actuator 20 manually by an operator, either in response to a monitored tire pressure reading or independently of the tire pressure, for example when changing the terrain a vehicle is travelling on. Alternatively, the valve 8 may be opened automatically in response to a monitored tire pressure reaching a threshold value.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An actuator for a tire inflation system comprising:
   a first component having a first fluid passage; and
   a second component having a second fluid passage and a sealing surface for sealing engagement with a rotatable component of a wheel assembly;
   the second component being movable relative to the first component between a first position where the first fluid passage is isolated from the second fluid passage and the sealing surface is spaced from the rotatable component and a second position where the first fluid passage is in fluid communication with the second fluid passage and the sealing surface is in sealing engagement with the rotatable component, wherein the first fluid passage is isolated from the second fluid passage by virtue of engagement between the first component and the second component and wherein a protrusion of one of the first and second components engages the other of the first and second components to isolate the first fluid passage from the second fluid passage.

2. The actuator of claim 1 wherein the second component is movable axially relative to the first component.

3. The actuator of claim 1 wherein the first component includes an inlet that supplies a fluid to the first fluid passage, or wherein the second component is movable to the second position in response to an increase in pressure in the first fluid passage.

4. The actuator of claim 3 wherein the second component is movable to the second position in response to fluid supplied to the first fluid passage exerting pressure on a face of the second component.

5. The actuator of claim 4 wherein a cross-sectional area of the face is greater than the cross-sectional area of the second fluid passage.

6. The actuator of claim 1 wherein fluid is supplied through the first fluid passage to move the second component to the second position, the fluid passing via the second fluid passage to a tire to be inflated, or wherein the second component includes a first bearing having an axis offset relative to an axis of rotation of the rotatable component.

7. The actuator of claim 6 wherein the second component includes a second bearing having an axis coincident with the axis of rotation of the rotatable component.

8. The actuator of claim 1 wherein the second component includes a body and the sealing surface is resiliently mounted to the body.

9. The actuator of claim 8 wherein the sealing surface is resiliently mounted to the body with a resilient member.

10. The actuator of claim 9 wherein the resilient member is made from an elastomeric material.

11. The actuator of claim 9 wherein the resilient member is an o-ring.

12. The actuator of claim 1 further comprising a bias device that biases the sealing surface of the second component away from the rotatable component.

13. The actuator of claim 12 further comprising a plurality of bias devices arranged around an annulus to bias the sealing surface of the second component away from the rotatable component.

14. The actuator of claim 1 further comprising a pin to prevent rotation of the first component relative to the second component.

15. The actuator of claim 1 further comprising a plurality of pins to prevent rotation of the first component relative to the second component.

16. The actuator of claim 1 wherein the protrusion is on the first component.

17. The actuator of claim 1 wherein the protrusion is positioned within the second fluid passage when the second component is in the first position and the protrusion is spaced apart from the second fluid passage when the second component is in the second position.

18. A system for changing a pressure in a tire comprising:
    a rotatable component of a wheel assembly having a rotatable fluid passage, a rotatable sealing surface arrangement, and being rotatably fast to a wheel; and
    an actuator having:
      a first component having a first fluid passage; and
      a second component having a second fluid passage and a sealing surface having sealing engagement with the rotatable component;
      the second component being movable relative to the first component between a first position where the first fluid passage is isolated from the second fluid passage and the sealing surface is spaced from the rotatable component and a second position where the first fluid passage is in fluid communication with the second fluid passage and the sealing surface is in sealing engagement with the rotatable component, wherein the first fluid passage is isolated from the second fluid passage by virtue of engagement between the first component and the second component and wherein a protrusion of one of the first and second components engages the other of the first and second components to isolate the first fluid passage from the second fluid passage;
    and wherein the sealing surface is selectively engageable with the rotatable sealing surface arrangement to selectively fluidly connect the first fluid passage to the rotatable fluid passage.

* * * * *